United States Patent

[11] 3,624,630

[72] Inventor George F. Schroeder
    Wayne, N.J.
[21] Appl. No. 882,169
[22] Filed Dec. 4, 1969
[45] Patented Nov. 30, 1971
[73] Assignee Singer-General Precision, Inc.
    Little Falls, N.J.

[54] CURRENT DETECTION SYSTEM
    3 Claims, 1 Drawing Fig.
[52] U.S. Cl. .................................................. 340/253 B,
                                                            340/251
[51] Int. Cl. .................................................. G08b 21/00
[50] Field of Search .................................................. 340/251,
                                       213, 253, 168 C, 174 WA

[56] References Cited
    UNITED STATES PATENTS

| | | | |
|---|---|---|---|
| 2,719,288 | 9/1955 | Young | 340/251 |
| 3,278,915 | 10/1966 | Joseph | 340/174 WA |
| 3,300,766 | 1/1967 | Koerner et al. | 340/174 WA |

*Primary Examiner*—Donald J. Yusko
*Assistant Examiner*—Daniel Myer
*Attorneys*—S. A. Giarratana and S. Michael Bender ABSTRACT: Apparatus for detecting the presence of current in at least one conductor connected in an electrical circuit, wherein a pulsating magnetic field is applied in the vicinity of a permeable member in flux exchange relation with the conductor to effect a change in flux density through the permeable member. A circuit is provided which produces an output signal in response to predetermined changes in the flux density.

PATENTED NOV 30 1971
3,624,630
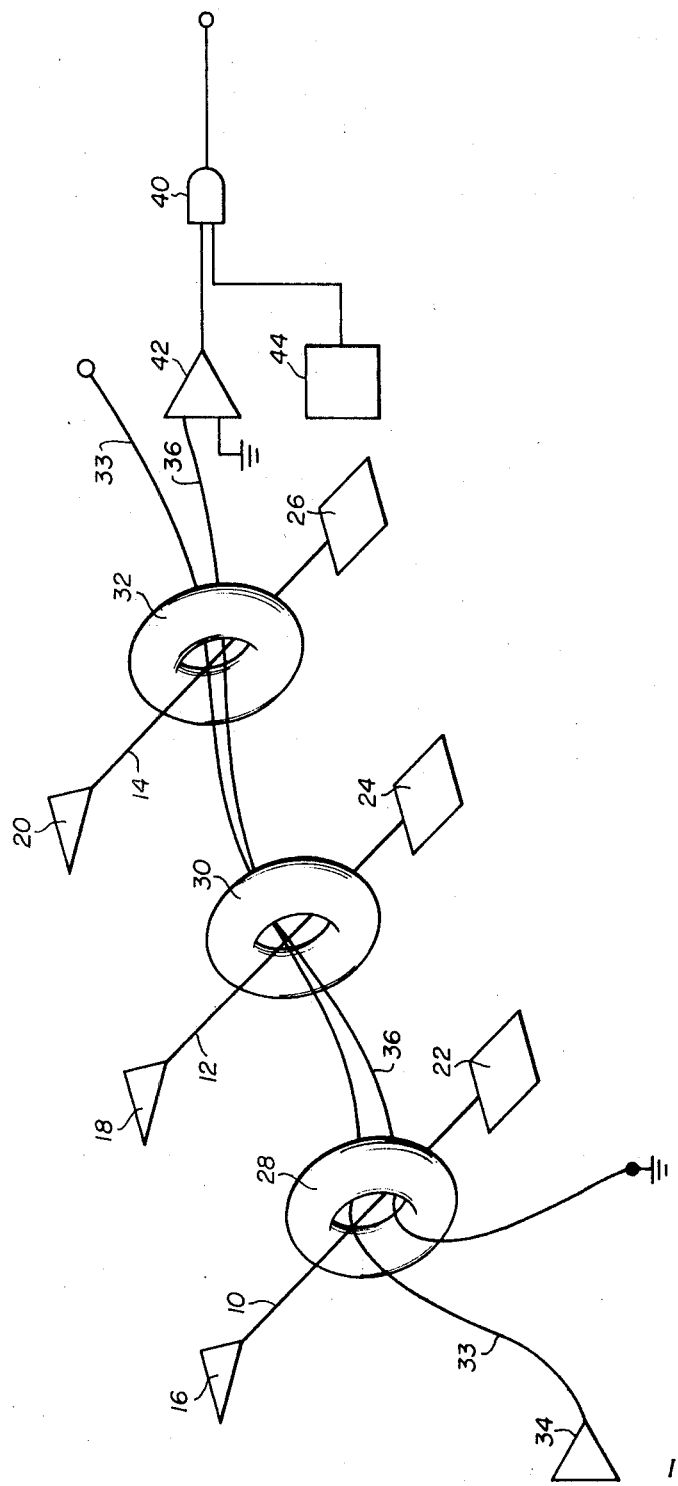
INVENTOR.
GEORGE F. SCHROEDER
BY
S. A. Giarratana
ATTORNEYS 3,624,630

CURRENT DETECTION SYSTEM

BACKGROUND OF THE INVENTION

This invention relates to a magnetic current detection system, and, more particularly, to a system for detecting current in at least one conductor connected in an electrical circuit.

Several needs have arisen for detecting the presence of current in an electrical conductor. For example, in display devices such as computers, aircraft panels, etc., a primary problem exists in determining whether all the filaments of the display lamps are functioning. The only sure way of testing this is for the operator to turn on all of the lamps and then optically scan each individual lamp to determine if its filament is, in fact, functioning. Of course, this requirement is highly undesirable, and to date no satisfactory solution has been proposed.

SUMMARY OF THE INVENTION

It is, therefore, an object of the present invention to provide a detection system whereby an operator of an electrical system may singularly determine if current is flowing in a large plurality of conductors in the system.

Toward the fulfillment of this object, the system of the present invention comprises at least one permeable member in flux exchange relation with the conductors to be tested, means to apply a magnetic field in the vicinity of said permeable member to effect a change in flux density through said permeable member, and means responsive to predetermined changes in the flux density to produce an output signal.

BRIEF DESCRIPTION OF THE DRAWING

Reference is now made to the accompanying drawing for a better understanding of the nature and objects of the present invention. The drawing illustrates the best mode presently contemplated for carrying out the objects of the invention and is not to be construed as restrictions or limitation on its scope. The drawing is a perspective, partial schematic, representation of the system of the present invention.

DESCRIPTION OF THE PREFERRED EMBODIMENT

Referring specifically to the drawing, it is assumed for the purposes of example that it is desired to detect the presence of a current in three conductors 10, 12, and 14, each connected between a source of electrical energy in the form of amplifiers 16, 18, and 20, respectively, and a load in the form of lamps 22, 24, and 26, respectively.

Toward this end, the conductors 10, 12, and 14 extend through a plurality of cores 28, 30, and 32, respectively, each made of a permeable material such as ferrite, and each formed into the shape of a toroid.

A reset circuit is provided in order to control the magnetic state of each core, and includes a conductor 33 extending through the cores, which conductor is supplied with electrical energy from an amplifier 34.

A sensing circuit is also provided, which includes a conductor 36 also extending through the cores 28, 30 and 32, and electrically connected to an AND-gate 40 via an amplifier 42 in a known manner. A strobe unit 44 is provided in conjunction with the gate 40 for purposes which will be explained in detail later.

The magnitude of the currents through the conductors 10, 12, 14, 33, and 36, and the size and permeability of each of the cores 28, 30, and 32 are such that the following operation is achieved. The current in each of the conductors 10, 12, and 14 brings the respective cores 28, 30, and 32 into a condition of flux saturation. Then a pulsating current applied through the conductor 33 via the amplifier 34 will apply a magnetic field to the cores causing a change in the flux density in each core at the beginning and end of each pulse, and thereby induce a voltage in the conductor 36. The design of the reset circuit is such that the magnetic field produced by the conductor 33 will be opposite in direction to, and at least twice as large in magnitude as, that produced by each individual conductor 10, 12, and 14. Thus a maximum flux change is ensured through each core 28, 30 and 32 if the latter had previously been placed in a magnetic saturated state by the presence of a current through its respective conductor 10, 12, and 14.

The strobe unit 44 is adapted to fire and produce a positive voltage at the trailing edge of each pulse of reset current, or immediately thereafter, in order that the strobe unit voltage may be compared with any voltage induced in the sensing conductor 36 by the changing flux as a result of the current going from a positive pulse to zero. The strobe unit is used in combination with the gate 40, so that the gate will provide an output signal only when there is a positive signal at the strobe unit 44, and a positive signal of a predetermined magnitude at the amplifier 42.

In operation, and assuming that the cores 28, 30, and 32 are all in a state of saturation as a result of current flowing through the conductors 10, 12, and 14, respectively, a positive pulse is applied to the reset conductor 33 and the resultant magnetic flux will cause the magnetic flux in each core to "flip" a full wave and induce a full voltage in the sensing conductor 36. In this manner, when the reset current through the conductor 33 goes back to zero, the magnetic flux in each core will flip back from the latter point to its original point and induce another full voltage in the conductor 36. Thus an input will be presented to the amplifier 42 which is equal to the sum of the three voltages supplied to the conductor 36 from the cores 28, 30, and 32. Since the strobe unit 44 is timed to fire during the latter induced voltages, and since the gate 40 is adapted to emit an output only when the above summed voltage is presented from the amplifier 42 and from the strobe unit, the gate will produce a positive signal which may be used to energize a light, or the like, indicating the presence of a current in each of the conductors 10, 12 and 14.

Assuming there is no current present through one or more of the conductors 10, 12 and 14 as a result of a deflective filament in the lamp associated with the particular conductor, the turning on of the pulsing reset current through the conductor 33 will cause the flux in the corresponding core to change from its initial state to the saturation point on the hysteresis loop of the core, thus inducing a voltage. When the reset current is reversed in direction, the movement will be simply along a generally horizontal line on the hysteresis loop and no voltage will be induced. Therefore, when the strobe fires in the same sequence as discussed above, the gate 42 will not receive a signal of sufficient magnitude from the amplifier 42 and will not produce an output signal. In this manner the operator can easily tell whether one or more of the lamps 22, 24 or 26 are defective.

It is noted that the above system is safe against possible errors which will result if some flux existed in the various cores due to random initial conditions. This is due to the fact that, in the absence of a load current, any of the residual flux may result in a flux change during turning on of the reset current, but the voltage thereby produced will not occur synchronously with the strobe. Therefore, there will be no output from gate 40.

It can be appreciated that in the event the currents in the conductors 10, 12, 14, 33 and 36 are too low to permit a sufficient magnetic field to exist, the conductors may be merely coiled around the cores 28, 30 and 32 any number of times in order to increase the magnetic field produced.

The major advantage of the above system is that the sensing device formed by the conductor 36, the amplifier 42, the gate 40, and the strobe 44 is small and inexpensive, and its installation is simple. Also, the output voltage is electrically isolated from the system it is testing so as not to upset the electrical arrangement of the primary display system.

Of course, many variations in the above are possible within the scope of the invention. For example a multiplicity of currents may be combined simultaneously or sequentially through a single core, and the output voltage detected singularly or in groups. In this manner the device can be used to detect the presence or absence of current flowing through any wires in any other system similar to the one disclosed. For example, when there is no voltage across a capacitor, the system of the present invention can be used to determine whether or not the capacitor is shorted or whether the device transmitting voltage to the capacitor failed to produce an output. Also, various bias currents can be inserted through the cores, and various combinations of logic employed to detect the presence of currents about a minimum offset from any desirable value.

Other variations of the specific arrangement of the system disclosed above can be made by those skilled in the art without departing from the invention as defined in the appended claims.

I claim:

1. Apparatus for detecting the presence of current in a first conductor connected in an electrical circuit, said apparatus comprising at least one permeable member in flux exchange relation with said conductor, means to apply a magnetic field in the vicinity of said permeable member to effect a change in flux density through said permeable member, means responsive to predetermined changes in said flux density to produce a first output signal, strobe means adapted to produce a positive signal, upon command from said means to apply a magnetic field and electrical gate means having a first input connected to said strobe means and having a second input connected to said means to produce said first output signal, said gate means adapted to produce a second output signal when said first output signal exceeds a predetermined level simultaneously with the occurrence of the positive signal at the output of the strobe means.

2. The apparatus of claim 1 wherein said means to apply a magnetic field comprises an amplifier and a second conductor connected to said amplifier, and wherein said amplifier is adapted for connection to a pulsating source of electrical energy.

3. The apparatus of claim 2 wherein said means to produce an output signal comprises a third conductor in flux exchange relationship with said permeable member, whereby said change in flux density induces a voltage in said third conductor, and wherein said means to produce said first output signal further comprises an amplifier, said amplifier connected in circuit to said third conductor for amplifying said induced voltage to produce said first output voltage.

* * * * *

PO-1050
(5/60)

UNITED STATES PATENT OFFICE
CERTIFICATE OF CORRECTION

Patent No. 3,624,630         Dated  November 30, 1971

Inventor(s) George F. Schroeder

It is certified that error appears in the above-identified patent and that said Letters Patent are hereby corrected as shown below:

Please change Assignee FROM: Singer-General Precision, Inc.

TO: The Singer Company

Recorded 9/20/71
      Reel 2767
      Frame 543 thru 546

Signed and sealed this 23rd day of May 1972.

(SEAL)
Attest:

EDWARD M. FLETCHER, JR.                      ROBERT GOTTSCHALK
Attesting Officer                                    Commissioner of Patents